Aug. 3, 1948.　　　　L. C. LOVE ET AL　　　　2,446,289
PRECOOLER SYSTEM FOR REFRIGERATED
DRINKING FOUNTAINS
Filed Jan. 8, 1948

Inventors
Lee C. Love
C. Henry Slauter
Richard H. Orthoefer Jr.

By
W. S. McDowell　　Attorney

Patented Aug. 3, 1948

2,446,289

UNITED STATES PATENT OFFICE 2,446,289

PRECOOLER SYSTEM FOR REFRIGERATED DRINKING FOUNTAINS

Lee C. Love and C. Henry Slauter, Columbus, and Richard H. Orthoefer, Jr., Worthington, Ohio, assignors to The Ebco Manufacturing Company, Columbus, Ohio, a corporation of Ohio Application January 8, 1948, Serial No. 1,108

4 Claims. (Cl. 257—179)

This invention deals with heat transfer apparatus, and has particular reference to an improved liquid pre-cooling system of the type utilized in conjunction with refrigerated water coolers or drinking fountains for initially cooling incoming fresh water prior to the passage thereof through the associated refrigerating system of the drinking fountain.

In the past, numerous attempts have been made in connection with refrigerated water coolers or drinking fountains to initially cool incoming fresh water prior to the passage thereof through the associated refrigerating apparatus, and the discharge thereof from the associated bubbler valve of the drinking fountain, by making use of waste water which has been previously cooled by the refrigerating apparatus, and which maintains a relatively low temperature after being discharged from the bubbler valve of the fountain, in order that economical and efficient use may be had of the refrigerating system of the cooler. The primary difficulties encountered with prior pre-cooler systems were caused by their failure to effect efficient heat transfer between the incoming fresh water and the waste or drainage water; it being understood that such heat transfer, in order to be economically practical, must necessarily be accomplished by conduction through the walls of the respective conduits employed in conducting incoming fresh water to the cooler and outgoing waste water therefrom.

It follows therefore, that the primary object of the present invention is to provide a heat transfer assembly which makes efficient and economical use of the waste water being discharged from a drinking fountain to initially cool the incoming fresh water prior to its passage through the refrigerating apparatus of the drinking fountain.

It is another object of this invention to provide an improved pre-cooler assembly for refrigerated water coolers which consists of a vertical drainage tube in which is formed a spiral courseway over which the normally cool waste water of the water cooler must pass during its discharge from the cooler, and a relatively smaller inlet water pipe spirally wound about the outer surface of the drainage tube, in order that the incoming water may be initially cooled by the waste water by conduction through the walls of the separate pipes or conduits.

It is a further object of the present invention to provide an improved pre-cooler assembly for refrigerated drinking fountains wherein the metallic walls of the associated drainage water outlet tube and the walls of the fresh water inlet tube are maintained in direct contact over a relatively large area, whereby the degree of coolness of the outgoing waste water may be efficiently transferred to the incoming and uncooled fresh water prior to its passage through an associated refrigerating system.

These and other objects and advantages will become more apparent with a further understanding of the present invention, which is to be had by reference to the following description and the appended drawing wherein.

Figure 1:
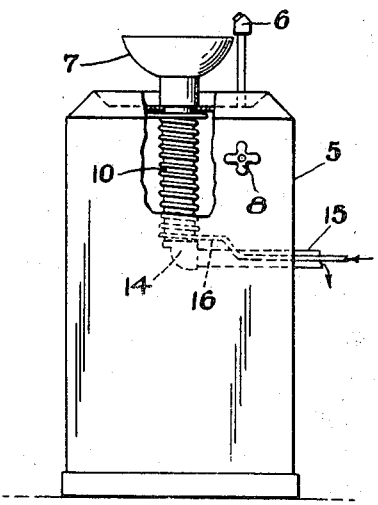
Fig. 1 is a side elevational view, partially in vertical section, of a water cooler embodying the present improved pre-cooler.

Referring now to the drawing, the numeral 5 generally designates the casing of an electrically refrigerated water cooler or drinking fountain having a discharge or bubbler valve 6 through which refrigerated fresh water is discharged for drinking purposes. Disposed below and adjacent to the bubbler valve 6 is a basin or sink 7 for the reception of waste water discharged from the bubbler valve when the latter is operated by means of the manually controlled valve handle 8.

It will be understood, that the basin or sink 7 may be formed in any suitable manner to receive and collect waste water from the bubbler valve, and usually embodies a body of generally concaved shape in which is disposed at the lower region thereof a drainage opening 9 for the discharge of waste water by gravity from the sink into an associated drainage conduit or tube.

In accordance with the present invention, use is made of a substantially vertically arranged drainage tube or waste water conduit 10 whose upper end is joined in any suitable manner as at 11 with the drainage outlet formed in the associated sink 7 of the cooler apparatus. The waste conduit 10 is preferably formed from a suitable metal having a relatively high degree of heat conductivity, such as copper or aluminum or the like, and which is formed along the outer side walls thereof with a continuous spiralled recess 12 which extends substantially throughout the length of the drainage tube. The recess 12 is defined by the outer side walls of the tube which are depressed inwardly and upwardly of the tube to form the inwardly and slightly upwardly disposed recess 12 along the outer surface of the tube, and to form along the interior surface thereof a continuously spiralled downwardly and outwardly inclined shelf or ledge 13. By nature of the downward and outward disposition of the ledge 13 with respect to the interior side walls of the tube, it will be seen that liquid introduced interiorly of the tube along the interior surface thereof will flow over the upper surface of the shelf 13 in an extended spiral courseway throughout the length of the drainage tube 10, and will be prevented by nature of the outwardly inclined disposition of the shelf from falling or flowing centrally of the tube in a straight downward path by gravity. The lower end of the drainage tube 10 may advantageously be coupled with an elbow joint 14, which in turn, receives a drainage tube extension 15 extending exteriorly of the water cooler casing 5 for connection with a suitable sewage disposal conduit, not shown.

Spirally wound about the outer surface of the drainage tube 10, and occupying the spiralled recess 12, is a relatively smaller fresh water inlet conduit 16 which has its lower end connected either internally of the water cooler casing, or externally thereof with a suitable fresh water supply source, not shown, and has its upper end connected with or disposed within a suitable refrigerating system, also not shown, carried within the casing 5 of the water cooler, and to which is connected the conduit associated with the bubbler valve 6. The portion of the conduit 16 which occupies the spiral recess 12 is formed so as to closely conform to the walls of the recess, in order that direct contact is maintained between a large portion of the outer surface of the inlet conduit 16 and the walls of the tube 10 which define the spiralled recess 12. As in the case of the material comprising the drainage tube 10, the inlet conduit 16 is preferably formed from a metal having a high degree of heat conductivity, in order that efficient heat transfer may be had between the contacting surfaces of the respective conduits. Preferably, connection between the two conduits is accomplished by soldering or brazing the respective outer surfaces of the conduit continuously along the plane of the outer side walls of the drainage tube 10, in order that direct contact between the two tubes is maintained throughout the length of the recess 12.

Figure 2:
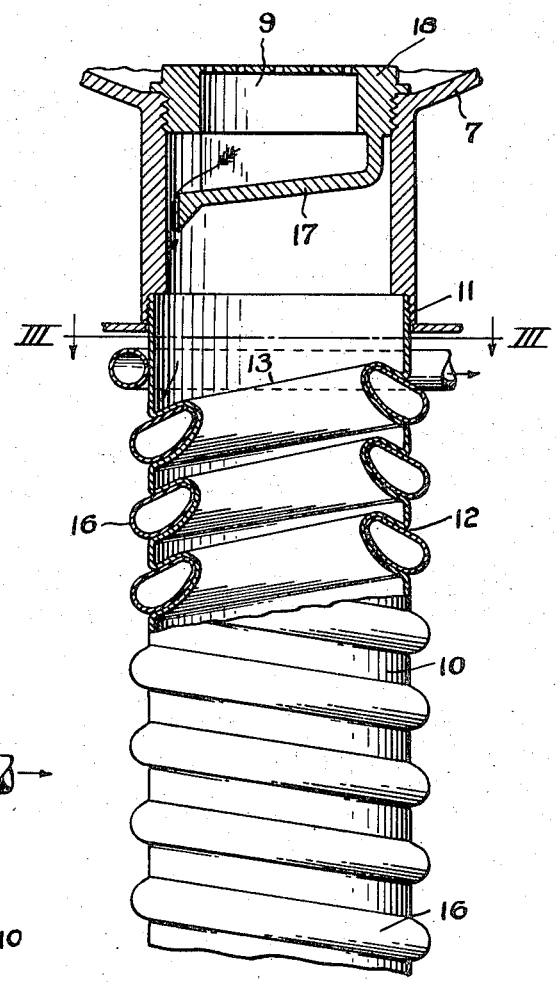
Fig. 2 is an enlarged detailed vertical sectional view, partially in elevation, of a pre-cooler assembly formed in accordance with the present invention.
Figure 3:
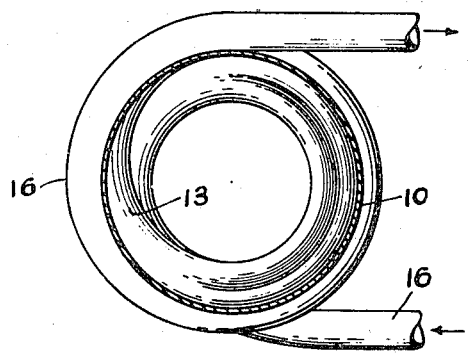
Fig. 3 is a horizontal sectional view taken along a plane indicated by the line 3—3 of Fig. 2.

In order to assure that waste water being discharged from the sink 7 is directed against the interior wall surface of the drainage conduit 10, provision is made, in the form of an inclined deflector plate or shelf 17 for directing the waste water being discharged from the sink outwardly along the interior surface of the drainage conduit 10, whereby such waste water is initially introduced upon the downwardly and outwardly inclined shelf 13, and prevented from flowing straight downwardly through the central portion of the drainage conduit. In this manner, waste water is made to follow the extended courseway provided by the spiralled shelf 13, thereby transmitting its degree of coldness to the walls of the tube 10 which define the spiral recess, and thence by conduction through the walls of the inlet conduit 16 to the incoming fresh water carried thereby. Thus it will be seen, that incoming fresh water carried by the tube 16 will be initially cooled prior to entering the refrigerating system of the cooler by the passage of the previously cooled waste water throughout the length of the shelf or ledge 13. The deflector plate 17, as shown in Fig. 2, may advantageously be carried or formed integral with a filter plug 18 of the type normally employed within the discharge sink 7 of such water coolers for the purpose of straining or filtering solid or foreign particles from the drainage water to prevent clogging the drainage system of the cooler. It will be understood, that the specific location of the deflector plate 17 is deemed immaterial to the present invention so long as the same occupies a position substantially at the upper end of the drainage tube 10 in order that water may be deflected initially against the side walls of the tube, rather than being permitted to flow directly through the axial passageway thereof.

While the present invention has been described as embodying or setting forth a precooler system for water coolers or drinking fountains, it will be understood that the aspects of the same are adaptable for use in many other capacities where efficient heat transfer is desirable or required, and wherein a liquid medium flowing by gravity is utilized to transmit or absorb heat to or from a fluid medium conducted by the outer spirally wound and smaller conduit.

It should be pointed out, that in forming the interior ledge 13 of the liquid receiving drainage conduit 10 in an outwardly and downwardly inclined manner, that liquids introduced along the interior wall surface of the conduit will necessarily be retained upon the shelf or ledge, and will consequently be made to follow the continuous extended courseway throughout the length of the tube, thereby increasing the surface area which is subjected to conductive heat transfer. Were it not for the outwardly inclined nature of the shelf, liquids flowing downwardly through the tube by gravity, would necessarily spill toward the center of the tube thereby reducing the efficiency of the system by reducing the surface area over which the liquid maintains direct contact.

While a preferred embodiment of the present invention has been disclosed in detail, it will be understood that various modifications as to details of construction may be accomplished without departing from the spirit of the invention, or the scope of the following claims.

We claim:

1. Heat transfer apparatus comprising a substantially vertically arranged straight liquid-receiving conduit having a liquid inlet at its upper end and a liquid outlet at its lower end, said conduit being formed with a continuous downwardly spiralled recess in the outer side walls thereof, the walls of said conduit which define said recesses being upwardly inclined toward the center line of said conduit and extending inwardly thereof, said walls forming a continuous downwardly spiralled and outwardly inclined shelf along the inner side walls of said conduit, means disposed at the inlet end of said conduit for directing incoming liquids against the inner side wall of said conduit, and a second fluid-receiving conduit disposed within the spiralled recess of said first conduit, said second conduit throughout its length having a portion of the outer surface thereof maintained in direct contact with the outer side walls of said first conduit defining said recess, whereby heat transfer may be had between fluids conducted by the respective conduits by conduction through the walls thereof.

2. Heat transfer apparatus comprising a substantially vertically arranged liquid-receiving conduit having the outer side walls thereof formed with a continuous downwardly spiralled recess, the side walls of said conduit which define said recess being depressed inwardly and upwardly of said conduit whereby to form along the interior surface thereof a downwardly and outwardly inclined spiralled shelf over which liquids introduced along the interior surface of said conduit may pass by gravity, means disposed at the upper end of said conduit for directing liquids introduced therein against the interior surface of said conduit, and a second fluid-receiving conduit spirally wound about the outer surface of said first conduit and occupying the recess formed therein, said second conduit having a portion of its outer surface throughout its length maintained in direct engagement with the outer surface of said first conduit, whereby heat transfer may be had between fluids conducted by the respective conduits by conduction through the adjoining walls thereof.

3. Heat transfer apparatus comprising a substantially vertically arranged cylindrical liquid-receiving conduit formed along its outer surface with an inwardly and radially disposed downwardly spiralled recess, the latter being defined by the outer side wall of said conduit, the side wall of said conduit being depressed inwardly and upwardly of said conduit whereby to form along the interior surface thereof a downwardly and outwardly inclined spiralled shelf over which liquids introduced along the interior surface of said conduit may pass by gravity, means carried within the upper portion of said conduit for directing liquids introduced therein outwardly against the interior surface of said conduit, and a second spirally wound fluid-receiving conduit disposed within the spiralled recess formed in said first conduit, said second conduit having a portion of its outer surface throughout its length maintained in direct engagement with the outer surface of said conduit defining said recess, whereby heat transfer may be had between fluids conducted by the respective conduits by conduction through the adjoining walls thereof.

4. A pre-cooler assembly for refrigerated drinking fountains comprising a substantially vertically disposed drainage tube for the reception of waste water discharged from a drinking fountain, said tube having the outer side walls thereof depressed inwardly and upwardly of said tube whereby to form an inwardly concave and continuous spiralled recess extending substantially throughout the length of said tube, the side walls of said tube defining said recess forming along the interior surface of said tube a downwardly and outwardly inclined continuous shelf over which waste water introduced within the upper portion of said tube may pass by gravity flow, and a fresh water inlet conduit spirally wound about the outer surface of said drainage tube within the recess formed therein, said inlet conduit having its outer surface maintained in direct contact with the outer surface of said drainage conduit, whereby incoming water carried by said inlet conduit may be cooled by waste water passing over the shelf formed upon the interior surface of said tube by conduction through the contacting surfaces of said conduit and said tube.

LEE C. LOVE.
C. HENRY SLAUTER.
RICHARD H. ORTHOEFER, Jr.

REFERENCES CITED

The following references are of record in the file of this patent:

UNITED STATES PATENTS

| Number | Name | Date |
|---|---|---|
| 640,122 | Foreman | Dec. 26, 1899 |
| 1,114,964 | Christensen | Oct. 27, 1914 |
| 1,492,696 | Moericke | May 6, 1924 |
| 2,010,504 | Askin | Aug. 6, 1935 |
| 2,127,848 | Smith | Aug. 23, 1938 |
| 2,276,964 | Grove | Mar. 17, 1942 |